United States Patent
Giaconi et al.

(10) Patent No.: US 12,438,765 B2
(45) Date of Patent: Oct. 7, 2025

(54) NETWORK ANOMALY DETECTION

(71) Applicant: BRITISH TELECOMMUNICATIONS PUBLIC LIMITED COMPANY, London (GB)

(72) Inventors: Giulio Giaconi, London (GB); Samuel Moore, London (GB); Christopher Nugent, London (GB); Shuai Zhang, London (GB); Ian Cleland, London (GB)

(73) Assignee: British Telecommunications Public Limited Company, London (GB)

( * ) Notice: Subject to any disclaimer, the term of this patent is extended or adjusted under 35 U.S.C. 154(b) by 210 days.

(21) Appl. No.: 17/997,424

(22) PCT Filed: Apr. 21, 2021

(86) PCT No.: PCT/EP2021/060460
§ 371 (c)(1),
(2) Date: Oct. 28, 2022

(87) PCT Pub. No.: WO2021/219468
PCT Pub. Date: Nov. 4, 2021

(65) Prior Publication Data
US 2023/0171277 A1 Jun. 1, 2023

(30) Foreign Application Priority Data

Apr. 30, 2020 (EP) .................................. 20172518

(51) Int. Cl.
*H04L 41/06* (2022.01)
*H04L 41/12* (2022.01)
(Continued)

(52) U.S. Cl.
CPC .............. *H04L 41/06* (2013.01); *H04L 41/12* (2013.01); *H04L 43/08* (2013.01); *H04L 43/16* (2013.01)

(58) Field of Classification Search
CPC . H04L 63/1425; H04L 63/1416; H04L 41/12; H04L 43/08; H04L 43/16; G06F 18/295; G06F 21/552
See application file for complete search history.

(56) References Cited

U.S. PATENT DOCUMENTS

| 5,465,321 A | 11/1995 | Smyth |
| 6,989,742 B2 | 1/2006 | Ueno et al. |

(Continued)

FOREIGN PATENT DOCUMENTS

| CN | 105722129 A | 6/2016 |
| CN | 107438052 A | 12/2017 |

(Continued)

OTHER PUBLICATIONS

Al-Fuqaha A., et al., "Internet of Things: A Survey on Enabling Technologies, Protocols, and Applications," IEEE Communication Surveys & Tutorials, vol. 17, No. 4, Fourth Quarter 2015, pp. 2347-2376.

(Continued)

*Primary Examiner* — Madhu Woolcock
(74) *Attorney, Agent, or Firm* — EIP US LLP (57) ABSTRACT

A method of identifying anomalous network activity. The method includes identifying, based on network data representative of network activity within a network, at least one instance of a sequence of events that occurred within the network. A probability of the sequence of events occurring during non-anomalous network activity is obtained based on transition probabilities between events in the sequence of events. A frequency characteristic dependent on a frequency (Continued)

at which the sequence of events occurred within the network is determined. A likelihood of the sequence of events occurring within the network at the frequency is determined based on a combination of the probability and the frequency characteristic. It is identified, based on the likelihood, that at least a portion of the network data is anomalous.

19 Claims, 4 Drawing Sheets

(51) Int. Cl.
H04L 43/08 (2022.01)
H04L 43/16 (2022.01)

(56) References Cited

U.S. PATENT DOCUMENTS

| | | | |
|---|---|---|---|
| 7,930,752 | B2 | 4/2011 | Hertzog et al. |
| 9,225,738 | B1* | 12/2015 | Chiles ............... H04L 63/1425 |
| 9,253,201 | B2 | 2/2016 | Song et al. |
| 9,471,544 | B1* | 10/2016 | Yu ........................ G06F 17/18 |
| 9,516,053 | B1* | 12/2016 | Muddu ............. G06F 16/9024 |
| 10,063,576 | B2 | 8/2018 | Song et al. |
| 10,425,702 | B2 | 9/2019 | Trainor et al. |
| 10,475,141 | B2 | 11/2019 | Mcintosh et al. |
| 10,673,880 | B1* | 6/2020 | Pratt .................. H04L 63/1425 |
| 11,159,415 | B2* | 10/2021 | McLean ............... G06Q 30/06 |
| 2003/0117279 | A1* | 6/2003 | Ueno ................ G08B 21/0423 340/523 |
| 2007/0300300 | A1 | 12/2007 | Guo et al. |
| 2010/0131952 | A1* | 5/2010 | Akiyama ............. G06F 11/079 718/100 |
| 2011/0145185 | A1 | 6/2011 | Wang et al. |
| 2014/0254772 | A1* | 9/2014 | Williams ................ H04M 3/24 379/32.01 |
| 2017/0230410 | A1 | 8/2017 | Hassanzadeh et al. |
| 2017/0244749 | A1* | 8/2017 | Shulman ............. H04L 63/1441 |
| 2018/0004941 | A1* | 1/2018 | Reinecke ............. G06F 21/566 |
| 2018/0004948 | A1* | 1/2018 | Martin ............... H04L 63/1425 |
| 2019/0182279 | A1 | 6/2019 | Song et al. |
| 2019/0323869 | A1 | 10/2019 | Kodeswaran et al. |
| 2019/0370143 | A1 | 12/2019 | Salunke et al. |
| 2023/0153428 | A1* | 5/2023 | Mitani .................. G05B 23/02 726/23 |

FOREIGN PATENT DOCUMENTS

| | | |
|---|---|---|
| EP | 1324290 A2 | 7/2003 |
| EP | 1708414 A1 | 10/2006 |
| EP | 3242240 A1 | 11/2017 |
| EP | 3242240 B1 | 11/2018 |
| EP | 3528457 A2 | 8/2019 |
| EP | 3531329 A1 | 8/2019 |
| GB | 2547201 A | 8/2017 |
| KR | 100950079 B1 | 3/2010 |

OTHER PUBLICATIONS

Blanco R., et al., "Anomaly Detection Using Gaussian Mixture Probability Model to Implement Intrusion Detection Systems," HAIS 2019, Hybrid Artificial Intelligent Systems, Retrieved from the Internet: https://link.springer.com/chapter/10.1007%2F978-3-030-29859-3_55, pp. 648-659.

Carnevali L., et al., "Learning Marked Markov Modulated Poisson Processes for Online Predictive Analysis of Attack Scenarios," 2019 IEEE 30th International Symposium on Software Reliability Engineering, IEEE, XP033708665, pp. 195-205.

Chandola V., et al., "Anomaly Detection for Discrete Sequences: A Survey," IEEE Transactions on Knowledge and Data Engineering, vol. 24, No. 5, May 2012, pp. 823-839.

Chatterjee S., "Anomaly Detection Strategies for IoT Sensors," Feb. 12, Retrieved from the internet: https://medium.com/analytics-vidhya/anomaly-detection-strategies-for-iot-sensors-6281e84263df, undated, 16 pages.

Chen L., et al., "Sensor-based Activity Recognition," IEEE Transactions on Systems, Man, and Cybernetics—Part C: Applications and Reviews, Nov. 2012, vol. 42, No. 6, pp. 790-808.

Colakovic A., et al., "Internet of Things (IoT): A Review of Enabling Technologies, Challenges, and Open Research Issues," Revised on May 18, 2018, 27 pages.

Combined Search and Examination Report under Sections 17 and 18(3) for Great Britain Application No. 2006412.7, mailed on Oct. 6, 2020, 9 pages.

Desnitsky V.A., et al., "Detection of Anomalies in Data for Monitoring of Security Components in the Internet of Things," IEEE, 2015, pp. 189-192.

Diaz M., et al., "State-of-the-Art, Challenges, and Open Issues in the Integration of Internet of Things and Cloud Computing," Journal of Network and Computer Applications, 2016, vol. 67, pp. 99-117.

Diro A.A., et al., "Deep Learning: The Frontier for Distributed Attack Detection in Fog-to-Things Computing," IEEE Communications Magazine, Feb. 2018, pp. 169-175.

Evans D., "The Internet of Things—How the Next Evolution of the Internet is Changing Everything," White Paper, Apr. 2011, 11 pages.

Extended European Search Report for Application No. 20172509.0, mailed on Oct. 22, 2020, 9 pages.

Extended European Search Report for Application No. 20172518.1, mailed on Sep. 8, 2020, 11 pages.

Fekade B., et al., "Probabilistic Recovery of Incomplete Sensed Data in IoT," IEEE Internet of Things Journal, Aug. 2018, vol. 5, No. 4, pp. 2282-2292.

International Search Report and Written Opinion for Application No. PCT/EP2021/060459, mailed on Jul. 9, 2021, 11 pages.

International Search Report and Written Opinion for Application No. PCT/EP2021/060460, mailed on May 7, 2021, 14 pages.

Karkouch A., et al., "Data Quality in Internet of Things: A State-of-the Art Survey," Journal of Network and Computer Applications, 2016, vol. 73, pp. 57-81.

Karkouch A., et al., "Data Quality Enhancement in Internet of Things Environment," IEEE, 2015, 8 pages.

Kasteren T.V., et al., "Accurate Activity Recognition in a Home Setting," Conference Paper, Jan. 2008, 10 pages.

Khanna R., et al., "Control Theoretic Approach to Intrusion Detection Using a Distributed Hidden Markov Model," IEEE Wireless Communications, Aug. 2008, pp. 24-33.

Leckie C., et al., "A Probabilistic Approach to Detecting Network Scans," Network Operations and Managment Symposium, 2002 IEEE/IFIP, Apr. 2002, Retrieved from the Internet: https://ieeexplore.ieee.org/document/1015594, pp. 359-372.

Lin J., et al., "A Survey on Internet of Things: Architecture, Enabling Technologies, Security and Privacy, and Applications," IEEE Internet of Things Journal, Oct. 2017, vol. 4, No. 5, pp. 1125-1142.

Moore S.J., et al., "Impact Analysis of Erroneous Data on IoT Reliability", IEEE Smart World, Ubiquitous Intelligence & Computing, Advanced & Trusted Computing, Scalable Computing & Communications, Cloud & Big Data Computing, Internet of People and Smart City Innovation, 2019, pp. 1908-1915.

Ni K., et al., "Sensor Network Data Fault Types," ACM Transactions on Sensor Networks, ACM, 2 Penn Plaza, Suite 701 New York NY 10121-0701 USA, vol. 5, No. 3, Jun. 4, 2009, XP058301703, ISSN: 1550-4859, DOI: 10.1145/1525856.1525863, pp. 1-29.

Nong Y., "A Markov Chain Model of Temporal Behavior for Anomaly Detection," Proceedings of the 2000 IEEE Workshop on Information Assurance and Security, Jun. 2000, pp. 171-174.

Notification of Grant for Great Britain Application No. 2006411.9, dated May 3, 2022, 2 pages.

Paschalidis I.C., et al., "Anomaly Detection in Sensor Networks based on Large Deviations of Markov Chain Models," Proceedings of the 47th IEEE Conference on Decision and Control, Dec. 9-11, 2008, pp. 2338-2343.

Rayes A., et al., "Internet of Things—From Hype to Reality: The Road to Digitization," Second Edition, 2019, 393 pages.

(56) References Cited

OTHER PUBLICATIONS

Saini N.K., "Trust Factor and Reliability-Over-a-Period-of-Time as Key Differentiators in IoT enabled Services," International Conference on Internet of Things and Applications (IOTA), 2016, pp. 411-414.

Santis G. DE., et al., "Internet-Wide Scanners Classification using Gaussian Mixture and Hidden Markov Models," Nov. 26, 2018, 6 pages.

Search Report under Section 17 for Great Britain Application No. 2006411.9, mailed on Oct. 8, 2020, 4 pages.

Sicari S., et al., "A Secure and Quality-Aware Prototypical Architecture for the Internet of Things," Information Systems, Feb. 2016, 15 pages.

Sicari S., et al., "A Security-and Quality-Aware System Architecture for Internet of Things," Information Systems Frontiers, 2016, vol. 18, pp. 665-677.

Stiawan D., et al., "Anomaly Detection and Monitoring in Internet of Things Communication," 8th International Conference on Information Technology and Electrical Engineering (ICITEE), 2016, 4 pages.

Thanigaivelan N.K., et al., "Distributed Internal Anomaly Detection System for Internet-of-Things," 2016 13th IEEE Annual Consumer Communications & Networking Conference (CCNC), 2 pages.

Treinen, J.J., "Heuristics for improved enterprise intrusion Detection", PhD thesis, published in Jun. 2009, 119 pages.

Casagrande et al., "Predicting Sensor Events, Activities, and Time of Occurrence Using Binary Sensor Data From Homes With Older Adults", IEEE Access, vol. 7, 2019, pp. 111012-111029.

Ordonez et al., "Sensor-based Bayesian Detection of Anomalous Living Patterns in a home setting", Pers Ubiquit Comput, vol. 19, No. 2, 2015, pp. 259-270.

Zhu et al., "Wearable Sensor-Based Behavioral Anomaly Detection in Smart Assisted Living Systems", IEEE Transactions on Automation Science and Engineering, vol. 12, No. 4, Oct. 2015, pp. 1225-1234.

\* cited by examiner

NETWORK ANOMALY DETECTION

PRIORITY CLAIM

The present application is a National Phase entry of PCT Application No. PCT/EP2021/060460, filed Apr. 21, 2021, which claims priority from EP Patent Application No. 20172518.1, filed Apr. 30, 2020, each of which is hereby fully incorporated herein by reference.

TECHNICAL FIELD

The present disclosure relates to identifying anomalous network activity.

BACKGROUND

The ever-increasing volume of network traffic makes it difficult to analyze potential threats within a network. For example, there are now a large quantity of devices in Internet of Things (IoT) networks. The IoT is a rapidly evolving paradigm that enables a range of services and applications. These services and applications are underpinned by the connectivity provided by the IoT, which enables machine-to-machine communication to happen at an unprecedented scale. However, the large quantity of devices found in IoT networks increases the variety of different attacks a malicious party may attempt, making such networks more vulnerable.

It can be difficult to distinguish benign and malicious activity within a network, such as an IoT network or an enterprise network. As the rate at which network events occur within a network is often very high, the quantity of false alarms can quickly become overwhelming if malicious activity is not accurately differentiated from benign activity.

SUMMARY

It is an aim of the present invention to at least alleviate some of the aforementioned problems.

According to a first aspect of the disclosure, there is provided a method of identifying anomalous network activity, the method comprising: identifying, based on network data representative of network activity within a network, at least one instance of a sequence of events that occurred within the network; obtaining a probability of the sequence of events occurring during non-anomalous network activity based on transition probabilities between events in the sequence of events; determining a frequency characteristic dependent on a frequency at which the sequence of events occurred within the network; determining, based on a combination of the probability and the frequency characteristic, a likelihood of the sequence of events occurring within the network at the frequency; and identifying, based on the likelihood, that at least a portion of the network data is anomalous.

In some examples, the network activity comprises port scanning and the method comprises identifying, based on the likelihood, that at least a portion of the network data represents anomalous port scanning. The network data may represent values indicative of a rate of port scanning for a respective time period. The method may comprise obtaining port scanning data indicative of port scanning of at least one port within the network and discretizing the port scanning data to obtain the network data.

In some examples, the probability is obtained using a trained statistical model. The trained statistical model may be trained using training data comprising further network data representative of the non-anomalous network activity within the network, the further network data different from the network data.

In some examples, the probability is obtained using a Markov model of the sequence of events. The Markov model may be a first order Markov model, a second order Markov model or a third order Markov model, for example.

In some examples, the frequency characteristic represents the frequency.

In some examples, the network data is obtained for a predetermined period of time and the frequency represents a number of instances of the sequence of events that occurred within the predetermined period of time.

In some examples, determining the likelihood comprises applying a power function to the probability, wherein an exponent of the power function depends on the frequency.

In some examples, the method comprises identifying, based on the network data, a plurality of sequences of events that occurred within the network, the plurality of sequences of events comprising the at least one instance of the sequence of events, wherein the frequency characteristic depends on the frequency and a further frequency at which the plurality of sequences of events occurred within the network. The frequency characteristic may represent a ratio between the frequency and the further frequency.

In some examples, each of the identifying at least one instance of a sequence of events, obtaining, determining a frequency characteristic, determining a likelihood, and identifying that at least a portion of the network data is anomalous are performed for each of a plurality of network activity types to identify whether the network activity represented by the network data represents anomalous network activity of at least one of the plurality of network activity types. The plurality of network activity types may comprise: a first activity type comprising port scanning of a first port of the network and a second activity type comprising port scanning of a second port of the network. The plurality of network activity types may additionally or alternatively comprise: a third activity type comprising network activity within a first portion of the network and a fourth activity type comprising network activity within a second portion of the network. Each of the plurality of network activity types may be associated with a respective threshold likelihood and identifying that at least the portion of the network data is anomalous for a given one of the plurality of network activity types may be based on comparing the likelihood and the threshold likelihood for the given one of the plurality of network activity types. Each of the plurality of network activity types is associated with a respective trained statistical model for obtaining the probability of the sequence of events occurring during non-anomalous network activity of the respective network activity type.

In some examples, the method comprises sending an alert to a client device after identifying that at least the portion of the network data is anomalous.

In some examples, the method comprises identifying, based on at least the portion of the network data, at least one of: a device that performed the anomalous network activity or a portion of the network in which the anomalous network activity occurred. In these examples, the method may comprise at least one of: blacklisting the device based on identifying that a number of times the anomalous network activity is performed by the device satisfies a first condition; and adjusting at least one characteristic of the portion of the network based on identifying that a number of times the anomalous network activity occurred in the portion of the network satisfies a second condition.

In some examples, the method is performed periodically.

According to a second aspect of the present disclosure, there is provided a system comprising: storage for storing network data representative of network activity within a network; at least one processor configured to: identify, based on the network data, at least one instance of a sequence of events that occurred within the network; obtain a probability of the sequence of events occurring during non-anomalous network activity based on transition probabilities between events in the sequence of events; determine a frequency characteristic dependent on a frequency at which the sequence of events occurred within the network; determine, based on a combination of the probability and the frequency characteristic, a likelihood of a sequence of events occurring within the network at the frequency; and identify, based on the likelihood, that at least a portion of the network data is anomalous.

In some examples, the network activity comprises port scanning and the at least one processor is configured to identify, based on the likelihood, that at least a portion of the network data represents anomalous port scanning.

In some examples, the probability is obtained using a trained statistical model. The trained statistical model may be trained using training data comprising further network data representative of the non-anomalous network activity within the network, the further network data different from the network data.

In some examples, the frequency characteristic represents the frequency.

According to a third aspect of the present disclosure, there is provided a computer-readable medium storing thereon a program for carrying out the method of any examples in accordance with the first aspect.

The disclosure includes any novel aspects described and/or illustrated herein. The invention also extends to methods and/or apparatus substantially as herein described and/or as illustrated with reference to the accompanying drawings. The disclosure is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The disclosure also provides a method of transmitting a signal, and a computer product having an operating system that supports a computer program for performing any of the methods described herein and/or for embodying any of the apparatus features described herein.

Any apparatus feature may also be provided as a corresponding operation of a method, and vice versa. As used herein, means plus function features may alternatively be expressed in terms of their corresponding structure, for example as a suitably-programmed processor.

Any feature in one aspect of the disclosure may be applied, in any appropriate combination, to other aspects of the disclosure. Any, some and/or all features in one aspect can be applied to any, some and/or all features in any other aspect, in any appropriate combination. Particular combinations of the various features described and defined in any aspects of the disclosure can be implemented and/or supplied and/or used independently.

As used throughout, the word 'or' can be interpreted in the exclusive and/or inclusive sense, unless otherwise specified.

The disclosure extends at least to methods of identifying anomalous network activity, a system and a computer-readable medium substantially as described herein and/or substantially as illustrated with reference to the accompanying drawings.

BRIEF DESCRIPTION OF THE DRAWINGS

The present disclosure is now described, purely by way of example, with reference to the accompanying diagrammatic drawings, in which.

DETAILED DESCRIPTION

The methods and apparatuses in accordance with the present disclosure provide the ability to identify anomalous network activity. A probability of a given sequence of events that occurred within a network is obtained (under the assumption that the activity within the network is non-anomalous), and combined with a frequency characteristic dependent on a frequency at which the sequence of events occurred within the network. In this way, the likelihood of that sequence occurring within the network at this frequency is obtained. Based on the likelihood, it can be determined whether the network data is anomalous, e.g. due to malicious network activity of a user of the network.

Existing rule-based approaches to identifying malicious activity are ill-equipped for processing large volumes of data, such as that obtained during typical network usage, and tend to have a high rate of false alarms. It is impractical and inefficient to investigate large numbers of alarms, especially where a high proportion of the alarms turn out to be false alarms upon more detailed investigation. However, by combining the probability with the frequency characteristic, the detection of anomalies can be performed accurately using the methods herein. In particular, malicious activity can be differentiated effectively from benign activity, reducing the volume of false alarms.

The methods described herein have a relatively low computational load and can be deployed easily. This allows the present approach to be implemented for networks in which a high volume of network events occur. Furthermore, anomalies can be detected using low complexity network data. This reduces memory usage compared to approaches that rely on high-dimensional or complex data structures.

By obtaining the likelihood of a given sequence of network events occurring at the frequency with which the sequence occurred, one-time incidences of malicious activity can be distinguished from persistent malicious activity, which is typically indicative of a more serious threat to the network. The ability to differentiate between different threat profiles is valuable, as it allows the most serious threats to be identified and eliminated more efficiently. The reliability and security of the network is thereby enhanced.

Figure 1:
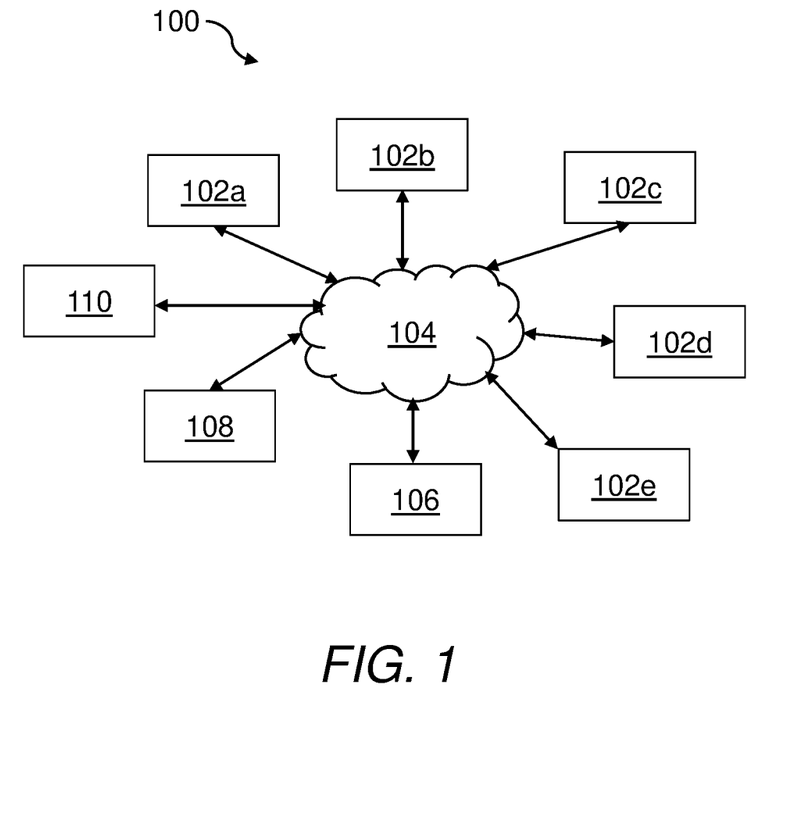
FIG. 1 is a schematic diagram showing an example system for use with the methods herein.

FIG. 1 is a schematic diagram showing an example system 100 for use with the methods herein, to put the methods and apparatuses herein into context. The system 100 includes a plurality of computer systems 102a-102e. Each of the computer systems 102a-102e may be similar to the computer system 500 described further below with reference to FIG. 5.

The computer systems 102a-102e are each connected to a network 104 in FIG. 1. In this way, the computer systems 102a-102e can communicate with each via the network 104. The network 104 may be a single network or may comprise a plurality of networks. The network 104 may be or include a wide area network (WAN), a local area network (LAN) and/or the Internet, and may be a personal or enterprise network. At least one of the computer systems 102a-102e may be or form part of an IoT device and may therefore form part of an IoT network. An IoT device is for example a device with the means to communicate data within the environment, e.g. over a network local to the environment. Examples of IoT devices include connected refrigerators, which can provide convenient online grocery shopping functionality, smart televisions (TVs) and voice assistant devices.

The computer systems 102a-102e each interact with the network 104. Each network action performed by a computer system 102a-102e may be considered to a network event, which may be referred to herein as an event. In one case, at least one of the computer systems 102a-102e performs port scanning, which is an example of network activity. Port scanning for example refers to sending a client request to at least one port address to identify whether the at least one port is open. Benign port scanning can occur frequently, e.g. in IoT networks and enterprise networks. However, port scanning may, in some cases, be malicious. The methods herein allow malicious port scanning to be identified as anomalous network activity, and hence distinguished from benign port scanning.

In the example 100 of FIG. 1, network data representative of network activity within the network 104 is obtained. The network data obtained generally represents at least one interaction between at least one of the computer systems 102a-102e and the network 104, e.g. at least one network event. For example, where one of the computer systems performs port scanning, the network data may represent the number of ports scanned or the rate of port scanning by the computer system in the network 104.

In the example of FIG. 1, the network data is obtained by a monitoring system 106, which is arranged to monitor network events within the network 104 and generate network data representative of such events. In one case, the monitoring system 106 includes a network tap (terminal access point), which is a device configured to analyze network traffic. A network tap typically has at least three ports: an A port, a B port and a monitor port. A tap between the A and B ports transfers data received to the desired destination, while also copying the data to the monitor port. In another case, the monitoring system 106 includes a device (such as a router or switch) configured to implement the NetFlow protocol to collect network traffic as it enters or exits the device. The network data represents or is otherwise based on the network traffic in these cases.

In the example 100 of FIG. 1, the monitoring system 106 sends the network data to a server 108 via the network 104. The server 108 stores the network data and processes the network data to identify anomalies. The server 108 in this case is a further computer system, which may be similar to or the same as any of the computer systems 102a-102e connected to the network 104. In other cases, though, the monitoring system 106 need not send the network data to a server. In such cases, the monitoring system 106 may itself process the network data to identify the anomalies.

After identifying anomalous network activity (e.g. using the methods described herein with reference to FIG. 2), the server 108 sends an alert to a client device 110 via the network 104. The client device 110 in this case is a computing device, such as a desktop computer, laptop computer or mobile phone (e.g. a smartphone). The alert indicates to the client device 110 that at least the portion of the network data is anomalous. The alert may be in any suitable format, e.g. an electronic message (such as an email or text message) or a notification in an application associated with the monitoring system 106. Based on the alert, a user of the client device can take suitable action to address the anomaly, as discussed further with reference to FIG. 2. Of course, it will be appreciated that in other cases the alert may be sent to an automated system for further processing.

Figure 2:
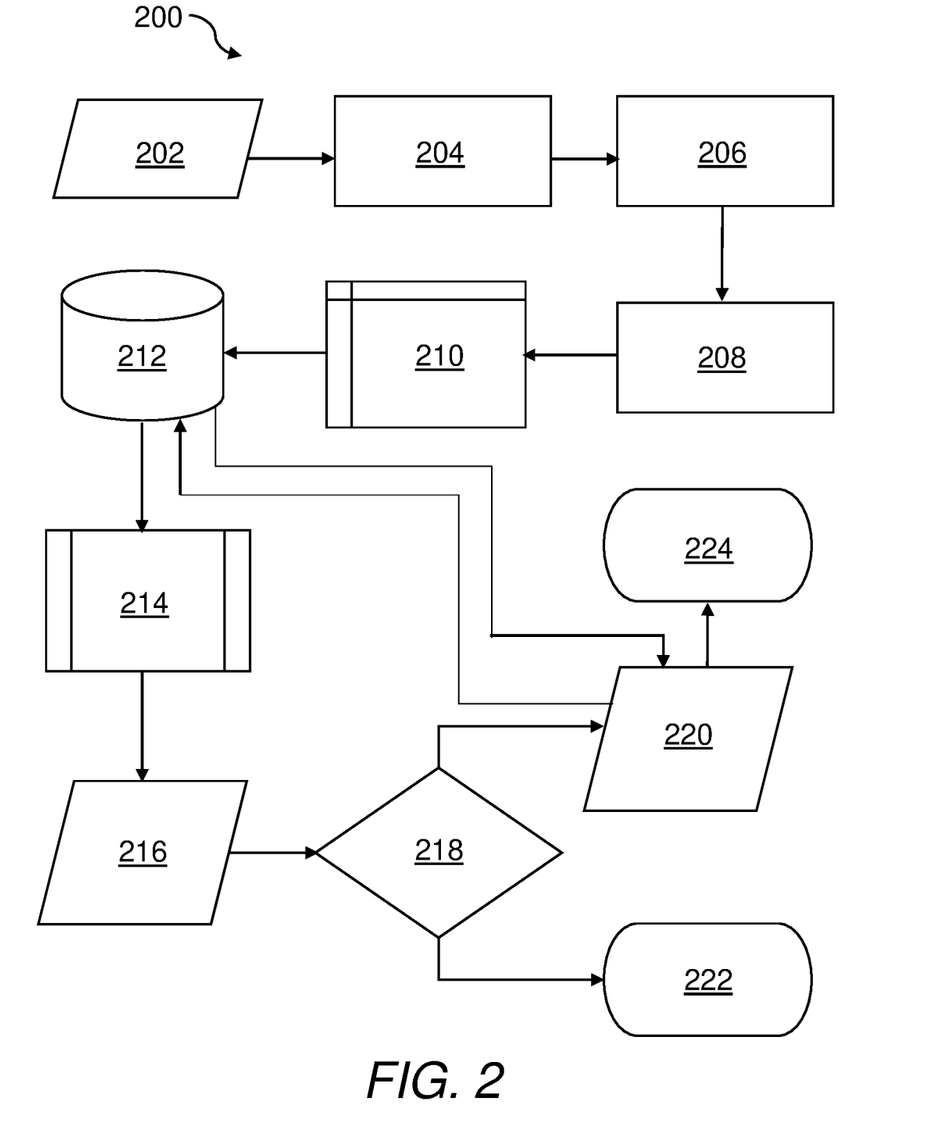
FIG. 2 is a flow diagram showing an example method of identifying anomalous network activity.

FIG. 2 is a flow diagram showing an example of a method 200 of identifying anomalous network activity within a network such as the network 104 of FIG. 1. The example method 200 of FIG. 2 is used to identify anomalous port scanning, but it is to be appreciated that a similar approach may be used to identify anomalous network activity of a different type than port scanning.

In FIG. 2, port scanning data 202 indicative of port scanning of at least one port within at least part of the network. For example, the port scanning data 202 may indicate the number of times each of the at least one ports is scanned over a given time period or the number of ports within a given portion of the network that are scanned within the given time period. The port scanning data is obtained by a monitoring system such as that of FIG. 1 in this example. The port scanning data may relate to a single port of the network, a plurality of ports of the network or all ports of the network (or a predetermined part of the network) that have been scanned.

A large number of port scanning attempts may occur within a network, which makes it challenging to analyze individual attempts. In the method 200 of FIG. 2, the port scanning data is aggregated 204 for respective time periods, to give an overview of the port scanning activity within the network. This reduces the data to be processed but nevertheless allows anomalous network activity to be effectively identified. Each of the respective time periods over which the port scanning is aggregated may be of the same length, which in some cases depends on the average volume of traffic within the network 104 or part of the network 104. For example, in very large networks with high network traffic, the method of FIG. 2 may be performed more frequently than in smaller networks, with a smaller amount of network traffic. The time periods over which the port scanning data is aggregated may therefore be shorter for the very large network than for the smaller network. As an example, aggregating the port scanning data over each of a plurality of one second time periods for a given port may involve calculating the number of port scans of the given port per second. In other cases, though, the time periods over which the port scanning data is aggregated may be time-varying. In other words, some of the time periods may be longer than others. The length of each of the time periods may vary dynamically depending on the network traffic, e.g. so that the time periods are shorter when there is higher network traffic. In other words, the time periods over which the port scanning data is aggregated may be varied, e.g. in response to changes to the network, for example to handle higher traffic across the network or in order to increase or decrease the number of alerts generated using the methods herein. In other cases, port scanning data for different ports may be aggregated using different time periods, e.g. so that data is aggregated over a longer time period for ports that are generally scanned less frequently. The aggregated port scanning data may be considered to represent a density of port scanning, e.g. the number of port scans for a given time period, which may be referred to as a port scan density.

In FIG. 2, the port scanning data is discretized 206 to obtain network data indicative of port scanning activity within at least part of the network. Discretizing the port scanning data involves obtaining discrete values representing the port scanning activity from the port scanning, rather than using continuous values such as the number of times a port is scanned, the rate at which respective ports are scanned or the number of ports within a given portion of the network that are scanned. Data representing discrete values is more straightforward to process using various statistical techniques, such as using a Markov model (discussed further below). Hence, discretizing 206 the port scanning data facilitates efficient identification of anomalous network activity. In FIG. 2, the port scanning data is discretized 206 after aggregation 204, but in other cases aggregation may be omitted.

Discretization of port scanning data in this case includes assigning a value indicative of the port scan density (as represented by the port scanning data) to one of a set of discrete values or groups. There is a predetermined number of values or groups of the set, which may be selected based on expected, non-anomalous, activity. For example, the port scan density for a given time period may be assigned to one of the following groups: "low", "low-medium", "medium", "medium-high" or "high", indicating whether the port scan density during the given time period is low, low-medium, medium, medium-high or high, respectively. In other words, the discretization of the port scanning data may involve binning the values represented by the port scanning data by dividing these values into a series of intervals.

Figure 3:
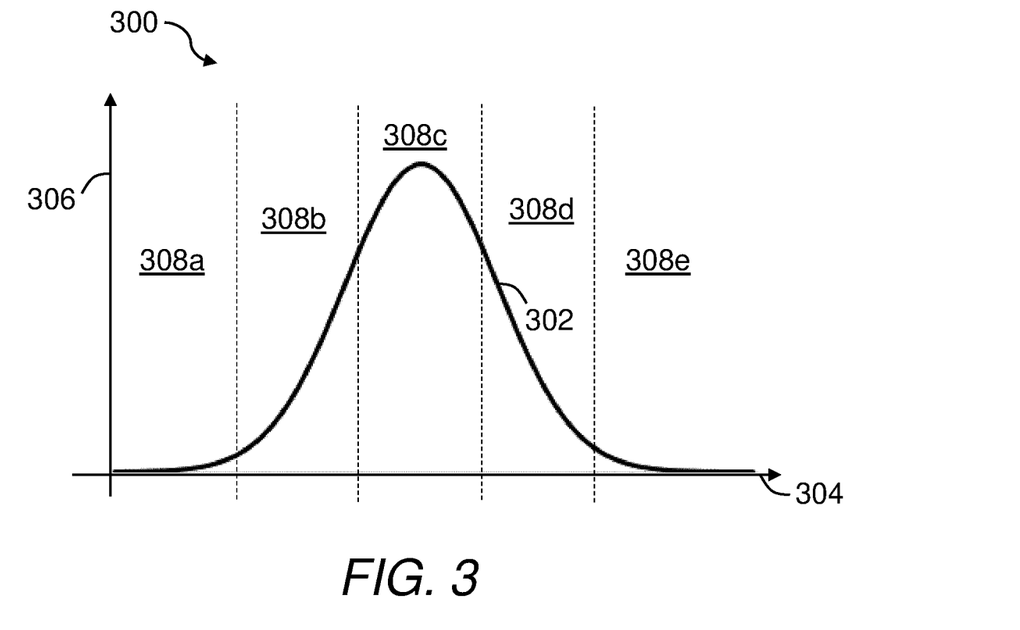
FIG. 3 is a schematic diagram showing an example of identifying suitable ranges for the discretization of port scanning data.

FIG. 3 is a schematic diagram showing an example 300 of identifying suitable ranges for the discretization of the port scanning data. In this example 300, a distribution 302 of the port scan density is obtained. The distribution 302 is a normal (i.e. Gaussian) distribution, with a mean that corresponds to the mean port scan density within the network with benign network activity. A standard deviation of the distribution 302 corresponds to an expected standard deviation for the port scan density within the network for benign network activity. The distribution 300 is illustrated in FIG. 3 with respect to an x-axis 304 that indicates the port scan density within the network and a y-axis 306 that indicates the frequency with which a corresponding port scan density occurs within the network. The distribution 300 is divided into a plurality of bins 308a-308e, each corresponding to a different range of values for the port scan density. A third bin 308c includes the mean value for the port scan density and is therefore considered to represent a "medium" port scan density. Second and first bins 308b, 308a correspond to lower ranges of values for the port scan density than that for the third bin 308c and are considered to represent a "medium-low" and a "low" port scan density, respectively. Conversely, fourth and fifth bins 308d, 308e correspond to higher ranges of values for the port scan density than that for the third bin 308c and are considered to represent a "medium-high" and a "high" port scan density, respectively.

It is to be appreciated that the ranges for the discretization of the port scanning data need not be obtained each time anomalous network activity is to be identified. Instead, such ranges may be obtained prior to identifying the anomalous network activity and then re-used for subsequent identification of anomalous network activity within the same network. However, if there are changes to the network (e.g. changes to the network topology or the addition of new software), the ranges for the discretization may be adjusted appropriately. For example, a new distribution 302 of the port scan density may be obtained for benign activity with the updated network. The new distribution may then be used to determine new ranges.

Figure 4:
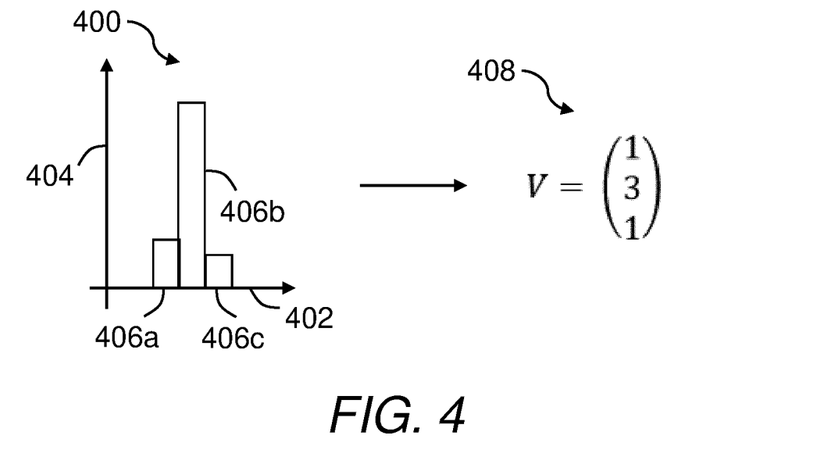
FIG. 4 is a schematic diagram showing an example of generating network data from port scanning data.

Port scanning data obtained during use of the network can be binned into one of these ranges to discretize the port scanning data and thereby obtain the network data. FIG. 4 is a schematic diagram showing an example of generating network data from port scanning data. FIG. 4 uses the ranges identified using the distribution 302 of FIG. 3.

FIG. 4 shows a histogram 400 generated from port scanning data representing the port scan density (which in this example represents the number of port scans for a given time period, which in this case is one second). The x-axis 402 of the histogram 400 indicates the time (divided into a plurality of time intervals) and the y-axis 404 of the histogram 400 indicates the port scan density that occurred within the network during a given time interval. The histogram 400 has three bins, 406a-406c. A first bin 406a corresponds to a first time interval, t1, from T to T+1, a second bin 406b corresponds to a second time interval, t2, from T+1 to T+2 and a third bin 406c corresponds to a third time interval, t3, from T+2 to T+3. In the first and third time intervals t1, t3 the port scan density is within the range associated with the second bin 308b of the distribution 302 of FIG. 3, i.e. the "low" range. In the second time interval t2, the port scan density is within the range associated with the fourth bin 308d of the distribution 300 of FIG. 3, i.e. the "high" range. It is therefore identified that the network experienced a low rate of port scans, then a high rate of port scans, and then a low rate of port scans. The first and third time intervals t1, t3 are assigned values indicative of a "low" number of port scans (an integer value of 1 in this case) and the second time interval t2 is assigned a value indicative of a "high" number of port scans (an integer value of 3 in this case). In this example, the values associated with each time interval are represented in the form of a vector 408. The network data represents the vector 408.

Each discrete value associated with a respective time interval may be considered to represent a network event. A series of discrete values therefore indicates a sequence of events that occurred within the network. In this case, the network data represents values indicative of a rate of port scanning for a respective time period (which in this case are in the form of the vector 408). For example, the first entry of 1 of the vector 408 indicates a "low" number of port scans during the first time interval and therefore indicates that the rate of port scanning for the first time interval is correspondingly low. It is to be appreciated that the example of FIG. 4 is simplified for the purposes of illustration. Typically, the network data represents a plurality of sequences of events, which may be represented as a plurality of vectors such as the vector 408, each of which may represent various sequences of events such as the same sequence of events as that of FIG. 4 (i.e. "low" port scan density, "high" port scan density, "low" port scan density) or a different sequence of events (e.g. ""medium" port scan density, "high" port scan density, "very high" port scan density).

Referring back to FIG. 2, after obtaining the network data, the method 200 involves identifying, based on the network data, at least one sequence of events that occurred within the network, e.g. using a sequence identification component of a system for identifying anomalous network activity. In this case, the network data is processed to identify an instance of a sequence of events, which in this case is an instance of the sequence of events represented by the vector 408 of FIG. 4, i.e. a "low" port scan density, then a "high" port scan density, and then a "low" port scan density.

It is to be appreciated that the number of network events that occur within a period of time, such as an hour or a day, may be relatively high depending on the size of the network. In some cases, a plurality of unique sequences of events that occurred within the environment is identified based on the network data, where each of the plurality of unique sequences comprises a predetermined number of events. The predetermined number of events may be selected such that each sequence is sufficiently long to reflect network activity that could indicate a malicious action, but not so long that a single sequence represents a plurality of distinct, separate actions or other activities. This allows the sequence of events to more accurately reflect discrete activities with malicious intent.

In some cases, a time at which each respective events occurred may be used to identify sequences of events, e.g. to identify the plurality of unique sequences. For example, if an amount of time between one event and a subsequent event meets or exceeds a given threshold, the event and the subsequent event may be considered to form part of separate sequences of events (rather than the same sequence).

Each sequence may be represented in the form of a vector, as explained with reference to FIG. 4. A length of the vector corresponds to the number of events in the sequence. For example, a given event may be represented by a corresponding numerical value, and the position of the given event in the vector may represent the order in which it was performed, relative to the other events in the sequence.

Once the plurality of unique sequences of events have been identified, the at least one instance is identified from the plurality of unique sequences. There may be multiple instances of one or more of the unique sequences, e.g. if the user performs the same activity multiple times over the period within which the network data was collected.

A probability of obtaining the sequence of events (for which the at least one instance was identified) is obtained, e.g. using a probability calculation component. In examples such as that of FIG. 2, the probability is for obtaining this particular sequence of events during non-anomalous network activity, for example assuming normal, expected or otherwise benign network activity.

In the example of FIG. 2, the probability is obtained using a trained statistical model, which embodies statistical assumptions regarding the sequences of events that may occur given non-anomalous network activity. A statistical model is a trained statistical model e.g. where parameter values of the model have been obtained based on expected sequences of events obtainable under the non-anomalous conditions.

In FIG. 2, the trained statistical model has been trained using training data representative of non-anomalous network activity within the network. In this case, the training data comprises further network data representative of the non-anomalous network activity, although in other cases the training data may be artificially generated training data representing expected non-anomalous network activity, rather than data based on actual network traffic. The further network data is different from the network data which is to be analyzed to identify anomalies. For example, the further network data may be obtained prior to use of the method of FIG. 2 for identifying anomalies, e.g. before the network data is collected. The further network data may be obtained from the network during a previous period in which computing devices interacted with the network in a routine manner, reflective of usual or common interactions with the network.

In FIG. 2, the probability is obtained using a Markov model of the sequence of events. In this case, the probability represents an element of a transition matrix 210 associated with a Markov chain for the sequence of events. The Markov chain in this case is an example of a trained statistical model, which has been trained using training data representative of non-anomalous network activity. The training data in this example has been used to obtain the transition matrix 210, which may be considered to be a trained transition matrix 210.

As will be appreciated, the transition matrix 210 (or other engine or component for obtaining the probability) may be retrained as desired. For example, additional training data, e.g. for retraining the transition matrix 210, may be obtained if the network changes, e.g. in structure and/or in software.

Referring back to FIG. 2, in this example, a Markov chain is used to obtain the probability of the sequence of events occurring with non-anomalous network activity. A Markov chain is a stochastic model for representing sequences of events (which may be referred to as states). For example, a state of a Markov chain may be taken as the port scan density for a given time period (e.g. represented by a discretized value as described with reference to FIGS. 3 and 4). An order of a Markov chain indicates how many previous states are taken into account in order to determine the probability of a given event occurring. For example, in a first order Markov chain, the probability of a given event occurring (such as a particular port scan density for a given time period, e.g. "low" or "high") depends only on the current state. In a second order Markov chain, the probability of the given event occurring depends on the current state, and the state immediately prior to the current state. Similarly, in a third order Markov chain, the probability of the given event occurring depends on the current state (which may be referred to as the state at a time t), the state immediately prior to the current state (which may be referred as the state at a time t−1), and the state immediately prior to that (which may be referred to as the state at a time t−2). The approaches herein can be applied to any order of Markov chain. Increasing the order of the Markov chain tends to increase the accuracy of anomaly detection up to a certain order. However, the computational intensity also increases. The inventors have found that first, second and third order Markov chains, and especially third order Markov chains, provide particularly good performance, especially in systems with limited computational resources. As an illustrative example, for the sequence of port scan densities ["low", "high", "low"], the state at t−2 may be considered to be a "low" port scan density, the state at t−1 may be considered to be a "high" port scan density, and the state at t may be considered to be a "low" port scan density.

As explained above, the transition matrix 210 in FIG. 2 has been trained on further network data reflecting the non-anomalous network activity. This results in an array providing the probability of changing to a particular state from a previous state, e.g. the probability of changing to "high" port scan density from "low" port scan density. The array is n-dimensional, depending on the order of the Markov chain. For example, the array is two-dimensional for a first order Markov chain, three-dimensional for a second order Markov chain and four-dimensional for a third order Markov chain.

The probability of a given sequence of events occurring within the network can be calculated from the transition matrix 210 using equation (1) for a first order Markov chain, equation (2) for a second order Markov order or equation (3) for a third order Markov chain:

$$P(S(t)|S(t-1)) \qquad (1)$$

$$P(S(t)|(t-1),S(t-2)) \qquad (2)$$

$$P(S(t)|S(t-1),S(t-2),S(t-3)) \qquad (3)$$

where P represents the probability, S represents the network event (e.g. the discretized port scan density where the method is use to identify anomalous port scanning) and t is a time interval. It is to be appreciated that similar approaches may also be used to obtain a probability of a given sequence of events for Markov chains of an nth order.

After obtaining the probability of a sequence of events occurring using the transition matrix 210, a frequency characteristic is obtained from a frequency determination component 212. The frequency characteristic is dependent on a frequency at which the sequence of events occurred within the network.

In the example of FIG. 2, the frequency characteristic represents the frequency. The frequency may be considered a measured frequency in that it is the actual frequency at which the sequence of events is identified to have occurred at. In this case, the frequency determination component 212 includes a database that is updated each time it receives a unique sequence of events. The database is configured to store each unique sequence of events itself, e.g. in the form of a vector. At a given time, the frequency at which the sequence of events occurred is determined by the frequency determination component 212 based on the number of unique sequences stored in the database and a time period over which the network data was obtained. After the method of identifying anomalous data is performed for a given time period, the unique sequences of events may be removed or otherwise cleared from the database and the frequency determination component 212 may begin to store new unique sequences for a further time period, for identifying anomalies occurring during the further time period.

A likelihood of the sequence of events occurring within the network at the frequency is then determined based on a combination of the probability (in this case, obtained by the transition matrix 210) and the frequency characteristic (which in this case represents the frequency at which the sequence of events occurred). In FIG. 2, this likelihood is obtained by a likelihood calculation component, which in this example comprises a combined Markov model 214. By combining the probability of the sequence of events occurring with the frequency characteristic, the example method 200 of FIG. 2 accounts for both the likelihood of a particular sequence occurring and the rate at which the particular sequence has occurred. In other words, the frequency characteristic has a direct impact on the overall likelihood, meaning that sequences that occur at an unusually low or high frequency can be accurately identified as anomalous.

The probability and the frequency characteristic can be combined in any suitable way to obtain the likelihood of the sequence of events occurring within the network at the frequency. In the example of FIG. 2, a combined Markov model 214 is used to obtain the likelihood 216. Determining the likelihood in this case comprises applying a power function to the probability. An exponent of the power function depends on the frequency in this example. Hence, in this case, the probability obtained using the transition matrix 210 (e.g. using equations (1), (2) or (3) for first, second or third order Markov chains) is raised by the power x, where x represents the frequency. For example, equation (5) may be used to obtain the likelihood, $\mathcal{L}$, for a second order Markov chain:

$$\mathcal{L}=P(S(t)|S(t-1),S(t-2))^x \qquad (5)$$

where P represents the probability, S represents the network event, t is a time interval and x is the frequency.

With this approach, sequences that occur more frequently (with a larger x) result in a smaller value for the likelihood 216. In particular, the frequency of occurrence of the sequences has a direct impact on the likelihood 216, meaning that it is possible to assess if some sequences are occurring more often than expected and are hence likely to be anomalous. Similarly, sequences which are relatively unlikely to occur (with a smaller P) also result in a smaller value for the likelihood 216. Such sequences may be anomalous even they occur relatively infrequently over a given time period. Use of the likelihood 216 allows such sequences to be identified as such, in addition to identifying common sequences that have occurred at an unusually high rate.

After obtaining the likelihood 216, the method 200 of FIG. 2 involves identifying whether at least a portion of the network data is anomalous. In this case, the method 200 is used to identify whether at least a portion of the network data represents anomalous port scanning but in other cases a similar method may be used to identify other anomalous activity. In FIG. 2, the likelihood 216 is compared 218 with at least one threshold likelihood. Based on the comparison 218, either at least a portion of the network data (e.g. the portion of the network data representing a particular sequence of events) is identified as anomalous or the network data (or a portion thereof) is identified as non-anomalous 222 (e.g. normal or within expected bounds).

The threshold likelihood against which the likelihood 216 is compared 218 typically depends on the network data and may be tuned over time, e.g. to reduce false alarms. In some cases, the threshold likelihood includes a first threshold likelihood, which is e.g. a minimum likelihood. A particular sequence of events (and hence a portion of network data associated with that sequence of events) can be identified as anomalous if the likelihood 216 for that sequence of events is less than or equal to the first threshold likelihood. If the likelihood 216 for that sequence is less than the first threshold likelihood, this indicates that the sequence has occurred less frequently than expected, indicating that at least a portion of the network data representing the sequence is anomalous.

The threshold likelihood may also or instead include a second threshold likelihood, which is e.g. a maximum likelihood. A given sequence of events (and hence a portion of network data associated with the given sequence) can be identified as anomalous based on determining that the likelihood 216 for that sequence of events is greater than or equal to the second threshold likelihood.

In an illustrative example, the probability of a port scan density changing from "low" to "high" between one time interval and a subsequent time interval is low. This indicates that this sequence of events ("low" then "high" port scan density) is unlikely to occur during non-anomalous network activity. If the frequency of this sequence of events is also low, e.g. once per day, the overall likelihood 216 is less than the second threshold likelihood and the sequence is identified as non-anomalous 222. However, if the frequency of this sequence of events is much higher, e.g. if this sequence occurs 50 times in a day, the overall likelihood 216 exceeds the second threshold likelihood. The sequence (and hence the portion of the network data representative of the instances of the sequence that occurred in the day) is hence identified as anomalous. The likelihood 216 therefore allows one-off anomalous behavior to be distinguished from persistent behavior, e.g. persistent port scanning to probe the network for vulnerabilities.

In some cases, the likelihood 216 may be compared against both the first and second threshold likelihoods to determine whether it is greater than the first threshold likelihood and less than the second threshold likelihood, and therefore non-anomalous. In these cases, the second threshold likelihood is higher than the first threshold likelihood. This allows sequences that occur either less frequently or more frequently than expected to be identified as anomalous. The first and/or second thresholds can be selected, e.g. by a security engineer or using automated analysis of previous network data, such that the frequency at which alerts are generated is within a desired range. The approaches herein are hence flexible and can be used in a wide variety of different networks.

If the portion of the network data is identified as anomalous, an alert 220 is generated, and e.g. sent to a client device, as explained with reference to FIG. 1. A user of the client device, e.g. a network engineer or a cybersecurity expert, may then investigate the network to determine if action is to be taken, e.g. to reduce a vulnerability of the network to future anomalous activity. The security of the network is thereby enhanced.

In some cases, a likelihood that is identified as non-anomalous, e.g. that exceeds a first threshold likelihood and/or is less than a second threshold likelihood, may nevertheless be identified as potentially anomalous based on the value of the likelihood. For example, if the likelihood is relatively close to the first or second threshold likelihoods, the sequence of events associated with the likelihood may be identified as potentially anomalous. A further alert (e.g. a lower priority alert) may be generated for such potentially anomalous sequences, allowing the network to be investigated if desired.

Based on at least the portion of network data identified as being anomalous, at least one of a devices that performed the anomalous network activity or a portion of the network in which the anomalous network activity occurred can be identified. This for example involves processing of the portion of network data, e.g. as stored in the frequency determination component 212, to identify the device(s) and/or network portion(s) involved in a sequence of events identified as being anomalous. By identifying the device(s) and/or network portion(s) involved in the anomalous network activity, suitable action can be taken to mitigate the anomalous behavior.

In FIG. 2, an alert component configured to generate the alert 220 sends an indication to the frequency determination component 212 indicating that anomalous network data has been identified. For example, the alert 220 or the anomalous network data themselves may be sent as the indication, or the indication may be in a different format. The frequency determination component 212 monitors indications of anomalous network data to identify recurrent anomalous activity performed by a device or within a portion of the network. The frequency determination component 212 then sends an indication to the alert component if ongoing or repeated anomalous activity performed by or including the same element (such as by the same device or within the same portion of the network) is identified. The alert component is arranged to take further action 224 in response to the indication received from the frequency determination component 212, e.g. by sending a further alert to the client device or automated system or adjusting a property of the network based on the indication received from the frequency determination component 212.

In one example, the alert component is arranged to blacklist a device that is identified as performing anomalous network activity a number of times that satisfies a first condition, e.g. that exceeds a particular threshold. In this way, devices that cause an alert 220 to be generated a certain number of times can be automatically blacklisted. For example, a particular computer device identified as performing persistent malicious port scanning can be identified. By blacklisting such a device, the device is for example prevented from accessing the network and from performing the anomalous activity.

In another example, the alert component is arranged to adjust at least one characteristic of a portion of the network in which the anomalous network activity occurred based on identifying that the number of times the anomalous network activity occurred in the portion of the network satisfies a second condition, e.g. that exceeds a particular threshold which may be the same as or different from a threshold associated with the first condition. Network properties may thereby be automatically configured to reduce the risk of anomalous network activity in the portion of the network in future. For example, the portion of the network may be configured to prevent devices that operate a version of firmware which has previously been identified as anomalous from connecting to the portion of the network. In an example in which the anomalous network activity includes anomalous port scanning, a vulnerable port of the network may be identified and closed, to improve the security of the network. In some cases, the vulnerable port may be a port that was scanned repeatedly during the anomalous port scanning or another port that is nevertheless susceptible to attack.

Methods such as the method 200 of FIG. 2 may be performed periodically, e.g. at predetermined intervals (which may be constant or time-varying) such as once every hour or once every twenty-four hours. In this way, the network can be monitored over time, to identify anomalous network data as it is obtained. This enhances the security of the network by allowing anomalies to be detected (and addressed, if appropriate) at an early stage. The frequency with which the method 200 is performed can be selected to meet security requirements or in dependence on the network traffic. For example, in high traffic network, the method 200 may be performed once every 60 seconds, whereas in a home network, the method 200 may be performed once every day.

In some examples, the network data is obtained for a predetermined period of time and the frequency represents a number of instances of the sequence of events that occurred within the predetermined period of time. For example, network data may be collected over the predetermined period of time, such as over a 24-hour period, and may then be analyzed to identify unique sequences of events and to determine whether any of the unique sequences of events are anomalous. This process may then be repeated for each of a plurality of subsequent periods of time, e.g. for subsequent days.

Figure 5:
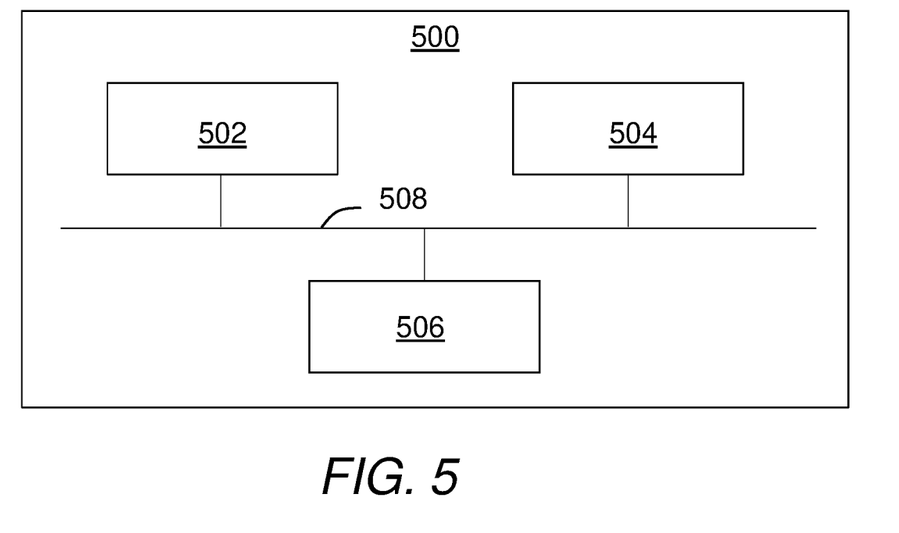
FIG. 5 is a schematic diagram showing internal components of an example computer system.

FIG. 5 is a schematic diagram of internal components of a system that may be used to implement any of the methods described herein, which in this example is a computer system 500. For example, the computer system 500 may be used as the server 108 and/or the client device 110 of FIG. 1. The computer system 400 in FIG. 4 is implemented as a single computer device but in other cases a similar computer system may be implemented as a distributed system.

The computer system 500 includes storage 502 which may be or include volatile or non-volatile memory, read-only memory (ROM), or random access memory (RAM). The storage 502 may additionally or alternatively include a storage device, which may be removable from or integrated within the computer system 500. For example, the storage 502 may include a hard disk drive (which may be an external hard disk drive such as a solid state disk) or a flash drive. The storage 502 is arranged to store data, temporarily or indefinitely. The storage 502 may be referred to as memory, which is to be understood to refer to a single memory or multiple memories operably connected to one another.

The storage 502 may be or include a non-transitory computer-readable medium. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data. In FIG. 5, the storage 502 is arranged to store network data representative of network activity within a network.

The computer system 500 also includes at least one processor 504 which is configured to implement any of the methods described herein. The at least one processor 504 may be or comprise processor circuitry. The at least one processor 504 is arranged to execute program instructions and process data, such as the network data. The at least one processor 504 is for example arranged to process instructions, obtained from the storage 502, to implement any of the methods described herein. The at least one processor 504 may include a plurality of processing units operably connected to one another, including but not limited to a central processing unit (CPU) and/or a graphics processing unit (GPU).

The computer system 500 further includes a network interface 506 for connecting to a network, such as the network 104 of FIG. 1. A computer system otherwise similar to the computer system 500 of FIG. 5 may additionally include at least one further interface for connecting to at least one further component, such as a display interface for connecting to a display device (which may be separable from or integral with the computer system). The components of the computer system 500 are communicably coupled via a suitable bus 508.

Alternatives and Modifications

Each feature disclosed herein, and (where appropriate) as part of the claims and drawings may be provided independently or in any appropriate combination.

It is to be appreciated that a similar method to the example 200 of FIG. 2 may be used to identify anomalous network activity other than anomalous port scanning. For example, the network data may represent log entries of log files of a monitoring system or other security system for monitoring network activity. In such cases, respective events of a sequence of events may correspond to a log entry of a log file, such as a log entry associated with a NetFlow record representing traffic within the network, an intrusion detection system (IDS), an IPS (intrusion prevention system), an anti-virus system, a firewall or an anti-malware system. In such cases, the anomalous network activity may represent an unauthorized attempt to gain access to at least part of the network. It is to be appreciated that the network data may represent network activity identified or otherwise recorded by a plurality of different systems, such as a NetFlow record and an IDS system. Furthermore, network activity other than port scanning that is nevertheless representable using continuous values may be aggregated and/or discretized in a similar manner to the aggregating 204 and discretizing 206 of FIG. 2.

In FIG. 2, the probability of the sequence of events occurring within the environment under non-anomalous conditions is obtained and then the frequency characteristic is determined. In other cases, though, the frequency characteristic may be obtained before or at the same time as the probability of the sequence of events occurring is obtained.

In FIG. 2, the frequency determination component 212 stores the unique sequences of events themselves. However, in other cases, the frequency determination component 212 may instead store an indication of each unique sequence or a count of the number of each unique sequence received, rather than storing the sequences themselves. These are merely examples, though, and in yet further cases, the frequency determination component 212 may store other data that nevertheless allows the frequency characteristic, such as the frequency at which the sequence of events occurred, to be determined.

FIG. 2 illustrates an example in which the frequency characteristic represents the frequency at which the sequence of events occurred within the network. This is merely an example, though, and in other cases the frequency characteristic may differ while nevertheless being dependent on the frequency at which the sequence of events occurred within the network.

In some cases, the frequency characteristic may depend on the frequency at which the sequence of events occurred and a further frequency at which a plurality of sequences of events occurred within the network. The plurality of sequences of events may be identified based on the network data and include the at least one instance of the sequence of events For example, for a second order Markov chain, the probability of a given sequence of events occurring within the environment can be calculated using equation (2) above as $P(S(t)|S(t-1), S(t-2))$. The likelihood of the sequence of events occurring within the network at the frequency may be computed as a joint probability, using equation (6):

$$P(S(t),S(t-1),S(t-2)) \qquad (6)$$

where P represents the probability, S represents the network event (e.g. the discretized port scan density where the method is use to identify anomalous port scanning) and t is a time interval.

To obtain such a likelihood, a probability obtained using a model derived from training data (in this case, a Markov transition matrix) can be combined with a frequency characteristic obtained from the network data. For example, using Bayes' theorem, the joint probability may be represented using equation (7):

$$P(S(t),S(t-1),S(t-2))=P(S(t)|S(t-1),S(t-2))P(S(t-1),S(t-2)) \qquad (7)$$

where P represents the probability, S represents the network event and t is a time interval. $P(S(t)|S(t-1), S(t-2))$ can be obtained from a transition matrix such as the transition matrix 210 described with reference to FIG. 2. $P(S(t-1), S(t-2))$ can be obtained from the network data, and depends on the frequency at which the sequence of events occurred within the network and a further frequency at which the plurality of sequences of events occurred within the network. For example, P(S(t−1)=s(t−1), S(t−2)=s(t−1)) can be approximated using equation (8):

$$P(S(t-1) = s(t-1),$$
$$S(t-2) = s(t-1)) \approx \frac{\text{no. pairs of}(s(t-1), s(t-2))}{\text{total no.pairs of } S(t-1), S(t-2)} \quad (8)$$

where P represents the probability, t is a time interval, s(t−1) and s(t−2) represent the measured events that occurred at t−1 and t−2 in the sequence of events, S(t−1) and S(t−2) represent two successively occurring events of the plurality of sequences of events, and equation (8) is evaluated over a predetermined time period over which the network data is obtained. It is to be appreciated that the number of pairs of s(t−1) and s(t−2) corresponds to the number of instances of the sequence of events that occurred over the predetermined time period. The number of pairs of s(t−1) and s(t−2) hence depend on the frequency at which the sequence of events occurred within the environment. The total number of pairs of S(t−1) and S(t−2) corresponds to the total number of instances of two successive events that occurred over the predetermined time period. The total number of pairs of S(t−1) and S(t−2) hence depends on the frequency at which the plurality of sequences of event occurred within the network, where in this example each of the plurality of sequences are of a given length (two events in this case). In this case, the frequency characteristic represents a ratio between the frequency and the further frequency at which the plurality of sequences of events occurred. However, it is to be appreciated that this is merely an example.

By combining P(S(t)|S(t−1), S(t−2)) and P(S(t−1)=s(t−1), S(t−2)=s(t−1)), the likelihood P(S(t),S(t−1), S(t−2)) can be obtained, which in this case corresponds to a joint likelihood. The likelihood can be compared to at least one threshold likelihood as described with reference to FIG. 2 to identify whether at least a portion of the network data is anomalous.

In FIG. 4, the sequence of events is represented as a vector. This is merely an example, though, and sequences of events may be represented in a different manner in other examples. Furthermore, in some cases in which the method is used to identify anomalous port scanning, the network data may represent the actual rate of port scanning for a respective time period rather than representing an aggregated and discretized value indicative of the rate of port scanning.

In the example of FIG. 2, the method 200 is applied to a network to identify anomalous port scanning, e.g. of a port or a plurality of ports of the network. However, the methods herein, such as the method 200 of FIG. 2, may be applied separately to each of a plurality of network activity types. For example, identifying the at least one instance of a sequence of events, obtaining the probability of the sequence of events occurring during non-anomalous network activity, determining the frequency characteristic and determining, based on a combination of the probability and the frequency characteristic, a likelihood of the sequence of events occurring within the network at the frequency may be performed for each of the plurality of network activity types to identify whether the network activity represented by the network data represents anomalous network activity of at least one of the plurality of network activity types. In this way, a plurality of instances of the methods herein, such as the method 200, may be generated, each for a respective network activity type.

Various features of an instance of the method (such as a statistical model used to generate the probability or at least one threshold to identify anomalous network activity) may depend on the network activity type. In some examples, each of the plurality of network activity types is associated with a respective trained statistical model (e.g. a Markov model) for obtaining the probability of the sequence of events occurring during non-anomalous network activity of the respective network activity type. The underlying statistical model for a plurality of network activity types may be the same as each other, but trained with different training data so as to obtain a different trained statistical model for each respective network activity type. For example, each statistical model may be a second order Markov chain. However, as each statistical model is trained using different training data (which represents non-anomalous network activity of the respective network activity type), the trained second order Markov chain (and hence the transition matrix) for each network activity type is different. In other cases, though, the underlying statistical model for each of a plurality of network activity types are different from each other. For example, one statistical model may be a second order Markov model, whereas another statistical model may be a third order Markov model. This allows the probabilities obtained using the statistical models to more accurately reflect non-anomalous network activity for each of the plurality of network activity types.

In some cases, each of the plurality of network activity types is associated with a respective threshold likelihood. In these cases, identifying that at least the portion of the network data is anomalous for a given one of the plurality of network activity types is based on comparing the likelihood and the threshold likelihood for the given one of the plurality of network activity types. In this way, each instance of the methods herein may be tailored to the particular network activity type the instance is configured to analyze. This can improve the accuracy with which anomalous network activity is identified.

In one case, the plurality of network activity types includes a first activity type including port scanning of a first port of the network (e.g. port 22 for the secure shell protocol (SSH)) and a second activity type including port scanning of a second port of the network (e.g. port 23 for the Telnet protocol). In this case, two instances of the methods herein for identifying anomalous network data are performed: one for identifying anomalous port scanning of the first port and one for identifying anomalous port scanning of the second port. In this case, the network data may be analyzed separately to identify port scanning of the first port for a first instance of the method 200 and port scanning of the second port for a second instance of the method 200.

In a similar manner, a separate instance of the methods herein may be used for each of a plurality of network activity types, so that there are a plurality of instances each for a respective network activity such as anomalous port scanning of a different respective port. In other cases, though (as in the example of FIG. 2), a single instance of the methods herein may be used to identify anomalous network activity, e.g. anomalous port scanning, for a plurality of network activity types, e.g. for port scanning of a plurality of different ports.

In another case, the plurality of network activity types includes a third activity type including network activity within a first portion of the network and a fourth activity type including network activity within a second portion of the network. In this case, two instances of the methods herein for identifying anomalous network data are performed: one for identifying anomalous network activity within the first portion of the network and one for identifying anomalous network activity within the second portion of the network. The first and second portions of the network may be entirely distinct (e.g. so that no components of the first portion of the network are within the second portion of the network, and vice versa), or the first and second portions of the network may share some (but not all) components. With this approach, anomalous network activity within particular network portions can be more effectively identified.

It is to be appreciated that the methods herein are very flexible. For example, the techniques described herein can be used within a single network or a portion of a network or can be used to identify anomalous network activity in a plurality of portions of a network (e.g. a subnetwork, sometimes referred to as a subnet) with multiple instances of the methods herein. A plurality of instances of the methods herein can be deployed in a flexible manner, to analyze network activity as desired. For example, a single instance may be used to identify anomalous port scanning of a port, such as port 22, within a network and three further instances may be used to identify anomalous network activity within three subnets within the network. A yet further instance may be deployed to identify anomalous network activity with the network as a whole. In this case, 5 instances are used within a single network, e.g. providing up to 5 separate alerts for a given time period (depending on whether anomalous network activity is identified). This is merely an example, though, and it is to be appreciated that in other cases different numbers of instances of the methods herein (which e.g. may be associated with different types of network activity) may instead be deployed.

Any reference numerals appearing in the claims are for illustration only and shall not limit the scope of the claims.

Embodiments described herein also relate to the following aspects:

1. A method of identifying anomalous network activity, the method comprising:
   (i) identifying, based on network data representative of network activity within a network, at least one instance of a sequence of events that occurred within the network;
   (ii) obtaining a probability of the sequence of events occurring during non-anomalous network activity based on transition probabilities between events in the sequence of events;
   (iii) determining a frequency characteristic dependent on a frequency at which the sequence of events occurred within the network;
   (iv) determining, based on a combination of the probability and the frequency characteristic, a likelihood of the sequence of events occurring within the network at the frequency; and
   (v) identifying, based on the likelihood, that at least a portion of the network data is anomalous.

2. The method according to aspect 1, wherein the network activity comprises port scanning and the method comprises identifying, based on the likelihood, that at least a portion of the network data represents anomalous port scanning, wherein optionally the network data represents values indicative of a rate of port scanning for a respective time period.

3. The method according to aspect 2, comprising:
   obtaining port scanning data indicative of port scanning of at least one port within the network; and
   discretizing the port scanning data to obtain the network data.

4. The method according to any one of aspects 1 to 3, wherein the probability is obtained using a trained statistical model, wherein optionally the trained statistical model is trained using training data comprising further network data representative of the non-anomalous network activity within the network, the further network data different from the network data.

5. The method according to any one of aspects 1 to 4, wherein the probability is obtained using a Markov model of the sequence of events, wherein optionally the Markov model is a first order Markov model, a second order Markov model or a third order Markov model.

6. The method according to any one of aspects 1 to 5, wherein the frequency characteristic represents the frequency.

7. The method according to any one of aspects 1 to 6, wherein determining the likelihood comprises applying a power function to the probability, wherein an exponent of the power function depends on the frequency.

8. The method according to any one of aspects 1 to 7, wherein the method comprises identifying, based on the network data, a plurality of sequences of events that occurred within the network, the plurality of sequences of events comprising the at least one instance of the sequence of events, the frequency characteristic depending on the frequency and a further frequency at which the plurality of sequences of events occurred within the network, wherein optionally the frequency characteristic represents a ratio between the frequency and the further frequency.

9. The method according to any one of aspects 1 to 8, wherein each of (i), (ii), (iii) and (iv) are performed for each of a plurality of network activity types to identify whether the network activity represented by the network data represents anomalous network activity of at least one of the plurality of network activity types.

10. The method according to aspect 9, wherein the plurality of network activity types comprises at least one of:
    a first activity type comprising port scanning of a first port of the network and a second activity type comprising port scanning of a second port of the network; or
    a third activity type comprising network activity within a first portion of the network and a fourth activity type comprising network activity within a second portion of the network.

11. The method according to aspect 9 or aspect 10, wherein each of the plurality of network activity types is associated with a respective threshold likelihood and identifying that at least the portion of the network data is anomalous for a given one of the plurality of network activity types is based on comparing the likelihood and the threshold likelihood for the given one of the plurality of network activity types.

12. The method according to any one of aspects 9 to 11, wherein each of the plurality of network activity types is associated with a respective trained statistical model for obtaining the probability of the sequence of events occurring during non-anomalous network activity of the respective network activity type.

13. The method according to any one of aspects 1 to 12, comprising sending an alert to a client device after identifying that at least the portion of the network data is anomalous.

14. The method according to any one of aspects 1 to 13, comprising identifying, based on at least the portion of the network data, at least one of: a device that performed the anomalous network activity or a portion of the network in which the anomalous network activity occurred, wherein optionally the method comprises at least one of:
  blacklisting the device based on identifying that a number of times the anomalous network activity is performed by the device satisfies a first condition; or
  adjusting at least one characteristic of the portion of the network based on identifying that a number of times the anomalous network activity occurred in the portion of the network satisfies a second condition.

15. A system comprising:
  storage for storing network data representative of network activity within a network;
  at least one processor configured to:
    (i) identify, based on the network data, at least one instance of a sequence of events that occurred within the network;
    (ii) obtain a probability of the sequence of events occurring during non-anomalous network activity based on transition probabilities between events in the sequence of events;
    (iii) determine a frequency characteristic dependent on a frequency at which the sequence of events occurred within the network;
    (iv) determine, based on a combination of the probability and the frequency characteristic, a likelihood of a sequence of events occurring within the network at the frequency; and
    (v) identify, based on the likelihood, that at least a portion of the network data is anomalous.

The invention claimed is:

1. A method of identifying anomalous network activity, the method comprising:
  identifying, based on network data representative of aggregated network activity within a network over a period of time, at least one instance of a sequence of events that occurred within the network;
  storing the at least one instance of the sequence of events that occurred within the network in a database;
  obtaining a probability of the at least one instance of the sequence of events occurring during non-anomalous network activity using a trained statistical model representative of a transition matrix based on transition probabilities between a particular event in the at least one instance of the sequence of events occurring immediately prior to a different particular event in the at least one instance of the sequence of events;
  determining a frequency characteristic representative of a frequency at which the at least one instance of the sequence of events is identified to have occurred within the network based on a number of times the at least one instance of the sequence of events is stored in the database over the period of time;
  determining, based on calculating a function of the probability and the frequency characteristic, a likelihood of the at least one instance of the sequence of events occurring within the network at the frequency;
  comparing the likelihood to a first threshold and a second threshold;
  identifying, based on the likelihood being less than the first threshold or greater than the second threshold, that at least a portion of the network data is anomalous; and
  sending an alert to a client device after identifying that at least the portion of the network data is anomalous.

2. The method according to claim 1, wherein the aggregated network activity comprises port scanning, and the method further comprises identifying, based on the likelihood, that at least a portion of the network data represents anomalous port scanning.

3. The method according to claim 2, further comprising:
  obtaining port scanning data indicative of port scanning of at least one port within the network; and
  discretizing the port scanning data to obtain the network data.

4. The method according to claim 2, wherein the network data represents values indicative of a rate of port scanning for a respective time period.

5. The method according to claim 1, wherein the probability is obtained using a Markov model of the at least one instance of the sequence of events.

6. The method according to claim 5, wherein the Markov model is a first order Markov model, a second order Markov model or a third order Markov model.

7. The method according to claim 1, wherein determining the likelihood comprises applying a power function to the probability, wherein an exponent of the power function depends on the frequency.

8. The method according to claim 1, wherein the method further comprises:
  identifying, based on the network data, a plurality of sequences of events that occurred within the network, the plurality of sequences of events comprising the at least one instance of the sequence of events, the frequency characteristic depending on the frequency and a further frequency at which the plurality of sequences of events occurred within the network.

9. The method according to claim 8, wherein the frequency characteristic represents a ratio between the frequency and the further frequency.

10. The method according to claim 1, wherein each of the identifying the at least one instance, obtaining the probability, determining the frequency characteristic, determining the likelihood, and identifying that the at least a portion of the network data is anomalous are performed for each of a plurality of network activity types to identify whether the aggregated network activity represented by the network data represents anomalous network activity of at least one of the plurality of network activity types.

11. The method according to claim 10, wherein the plurality of network activity types comprises at least one of:
  a first activity type comprising port scanning of a first port of the network and a second activity type comprising port scanning of a second port of the network; or
  a third activity type comprising network activity within a first portion of the network and a fourth activity type comprising network activity within a second portion of the network.

12. The method according to claim 10, wherein each of the plurality of network activity types is associated with a respective threshold likelihood and identifying that at least the portion of the network data is anomalous for a given one of the plurality of network activity types is based on comparing the likelihood and the threshold likelihood for the given one of the plurality of network activity types.

13. The method according to claim 10, wherein each of the plurality of network activity types is associated with a respective trained statistical model for obtaining the probability of the at least on instance of the sequence of events occurring during non-anomalous network activity of the respective network activity type.

14. The method according to claim 1, further comprising identifying, based on the at least the portion of the network data, at least one of: a device that performed the anomalous network activity, or a portion of the network in which the anomalous network activity occurred.

15. The method according to claim 14, further comprising at least one of:
  blacklisting the device based on identifying that a number of times the anomalous network activity is performed by the device satisfies a first condition; or
  adjusting at least one characteristic of the portion of the network based on identifying that a number of times the anomalous network activity occurred in the portion of the network satisfies a second condition.

16. The method according to claim 1, wherein the trained statistical model is trained using training data comprising further network data representative of the non-anomalous network activity within the network, the further network data being different from the network data.

17. The method according to claim 1, wherein the at least one instance of the sequence of events is stored in the database in the form of a vector.

18. The method according to claim 1, further comprising:
  determining the frequency at which the at least one instance of the sequence of events occurred within the network based on a number of sequences of events stored in the database and the period of time which the network data was obtained.

19. A system comprising:
  storage for storing network data representative of aggregated network activity within a network over a period of time; and
  at least one processor configured to:
    identify, based on the network data, at least one instance of a sequence of events that occurred within the network,
    store the at least one instance of the sequence of events that occurred within the network in a database;
    obtain a probability of the at least one instance of the sequence of events occurring during non-anomalous network activity using a trained statistical model representative of a transition matrix based on transition probabilities between a particular event in the at least one instance of the sequence of events occurring immediately prior to a different particular event in the at least one instance of the sequence of events,
    determine a frequency characteristic representative of a frequency at which the at least one instance of the sequence of events is identified to have occurred within the network based on a number of times the at least one instance of the sequence of events is stored in the database over the period of time,
    determine, based on calculating a function of the probability and the frequency characteristic, a likelihood of the at least one instance of the sequence of events occurring within the network at the frequency,
    compare the likelihood to a first threshold and a second threshold,
    identify, based on the likelihood being less than the first threshold or greater than the second threshold, that at least a portion of the network data is anomalous, and
    send an alert to a client device after identifying that at least the portion of the network data is anomalous.

* * * * *